(12) United States Patent
Liu

(10) Patent No.: US 8,166,845 B2
(45) Date of Patent: May 1, 2012

(54) THEFTPROOF CLUTCH HANDLE THAT IS DETACHED EASILY AND QUICKLY

(76) Inventor: Yao-Ming Liu, Yongkang (TW)

( * ) Notice: Subject to any disclaimer, the term of this patent is extended or adjusted under 35 U.S.C. 154(b) by 490 days.

(21) Appl. No.: 12/430,284

(22) Filed: Apr. 27, 2009

(65) Prior Publication Data
US 2010/0269621 A1    Oct. 28, 2010

(51) Int. Cl.
*G05G 1/04* (2006.01)
(52) U.S. Cl. ......................................................... 74/523
(58) Field of Classification Search ............... 74/484 R, 74/488, 489, 501.6, 502.2, 519, 523; 192/99 A, 192/114 R, 217; 70/192, 195, 196, 197, 70/201, 204, 207, 208, 209, 233
See application file for complete search history.

(56) References Cited

U.S. PATENT DOCUMENTS

| | | | | |
|---|---|---|---|---|
| 3,478,617 | A * | 11/1969 | Maeda | 74/489 |
| 5,910,193 | A * | 6/1999 | Chen | 74/489 |
| 6,047,611 | A * | 4/2000 | Warren et al. | 74/489 |
| 2010/0269622 | A1* | 10/2010 | Liu | 74/501.6 |

* cited by examiner

*Primary Examiner* — Vicky Johnson
(74) *Attorney, Agent, or Firm* — Alan Kamrath; Kamrath IP Lawfirm, PA

(57) ABSTRACT

A theftproof clutch handle for a motorcycle includes a clutch connector, at least one fixed shaft mounted on the clutch connector, a handle body removably mounted on the fixed shaft, and a locking shaft movably mounted on the handle body and releasably locked onto the fixed shaft. The fixed shaft has a locking groove. The handle body has at least one shaft hole. The locking shaft has a release groove. Thus, when the locking shaft is pressed, the fixed shaft is released from the release groove of the locking shaft, and the locking shaft is released from the locking groove of the fixed shaft to unlock the fixed shaft from the locking shaft so that the handle body can be removed from the fixed shaft to provide a theftproof effect.

17 Claims, 10 Drawing Sheets

THEFTPROOF CLUTCH HANDLE THAT IS DETACHED EASILY AND QUICKLY

BACKGROUND OF THE INVENTION

1. Field of the Invention

The present invention relates to a clutch handle and, more particularly, to a theftproof clutch handle for a motorcycle.

2. Description of the Related Art

A conventional theftproof clutch handle for a motorcycle in accordance with the prior art shown in FIG. 10 comprises a clutch connector 2 having a through hole 20, a handle body 1 removably mounted on the clutch connector 2 and having a through bore 10, and a fastening pin 3 extending through the through hole 20 of the clutch connector 2 and the through bore 10 of the handle body 1 to attach the handle body 1 to the clutch connector 2. Thus, when the fastening pin 3 is detached from the through hole 20 of the clutch connector 2 and the through bore 10 of the handle body 1, the handle body 1 can be removed from the clutch connector 2 so as to provide a theftproof effect. However, the fastening pin 3 is exposed outwardly from the clutch connector 2, thereby decreasing the outer appearance of the theftproof clutch handle. In addition, the handle body 1 can be mounted on the clutch connector 2 when the fastening pin 3 is missed.

BRIEF SUMMARY OF THE INVENTION

In accordance with the present invention, there is provided a theftproof clutch handle, comprising a clutch connector, at least one fixed shaft mounted on the clutch connector, a handle body removably mounted on the fixed shaft, and a locking shaft movably mounted on the handle body and releasably locked onto the fixed shaft to releasably lock the handle body onto the fixed shaft and the clutch connector. The fixed shaft has a locking groove. The locking shaft is secured in the locking groove of the fixed shaft to stop movement of the fixed shaft so as to lock the fixed shaft in the shaft hole of the handle body. The handle body has an end face provided with at least one shaft hole to allow insertion of the fixed shaft. The locking shaft has a mediate portion provided with a release groove that is movable to align with the shaft hole of the handle body and the locking groove of the fixed shaft and to allow passage of the fixed shaft so as to release the fixed shaft from the release groove of the locking shaft and to release the locking shaft from the locking groove of the fixed shaft.

The primary objective of the present invention is to provide a theftproof clutch handle that is detached easily and quickly.

Another objective of the present invention is to provide a theftproof clutch handle for a motorcycle, wherein when the locking shaft is pressed, the fixed shaft is released from the release groove of the locking shaft, and the locking shaft is released from the locking groove of the fixed shaft to unlock the fixed shaft from the locking shaft so that the shaft hole of the handle body can be detached from the fixed shaft to remove the handle body from the fixed shaft so as to provide a theftproof effect.

A further objective of the present invention is to provide a theftproof clutch handle for a motorcycle, wherein a user only needs to the locking shaft to remove the handle body from the fixed shaft so that the handle body can be removed from the fixed shaft easily and quickly, thereby facilitating the user detaching the theftproof clutch handle.

A further objective of the present invention is to provide a theftproof clutch handle for a motorcycle, wherein the locking shaft is fully hidden in the shaft bore of the handle body, and the soft protective jacket covers the snap ring and the elastic member to prevent the snap ring and the elastic member from being exposed outwardly from the locking shaft, so that the theftproof clutch handle has an outstanding outer appearance.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
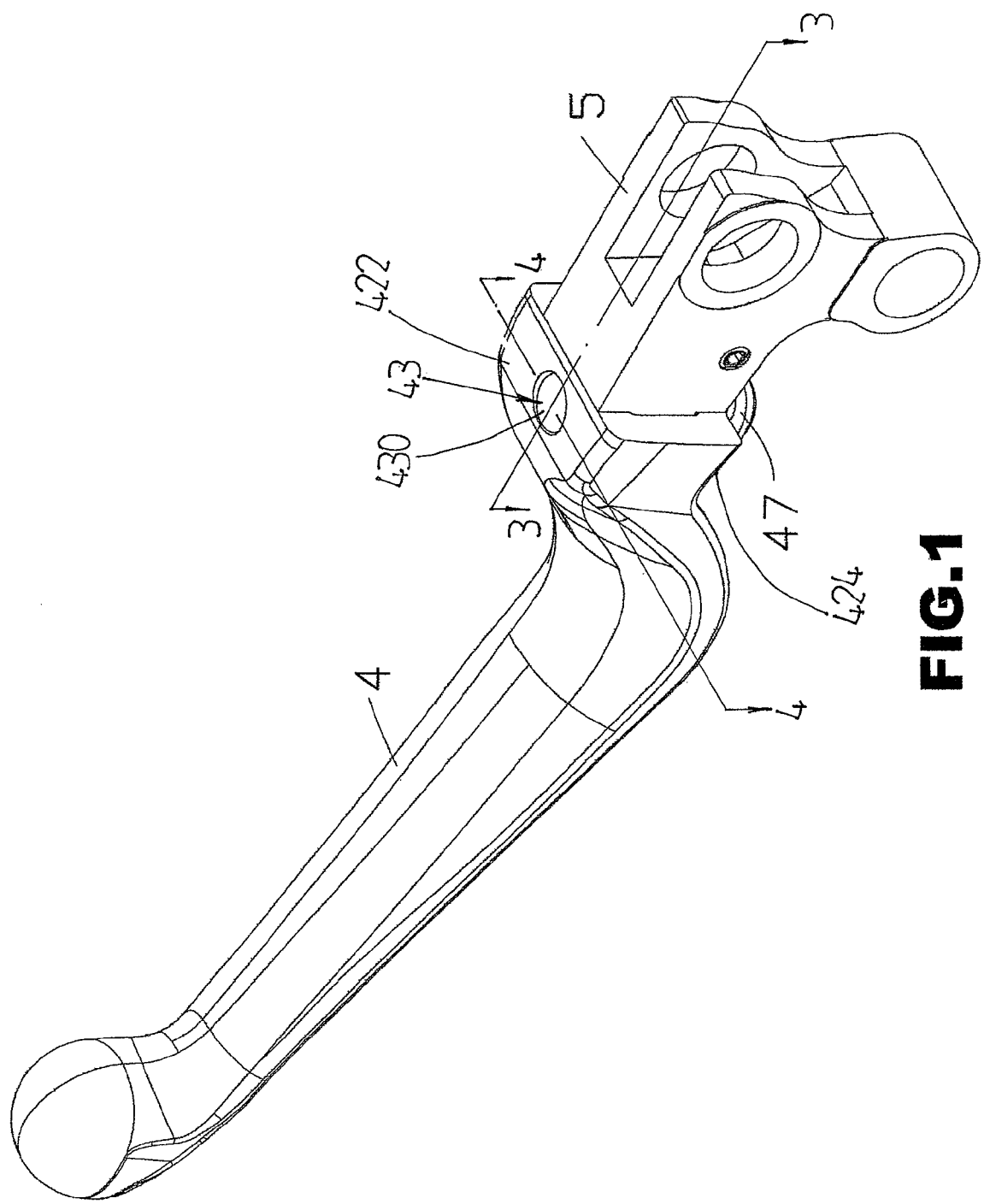
FIG. 1 is a perspective view of a theftproof clutch handle in accordance with the preferred embodiment of the present invention.
Figure 2:
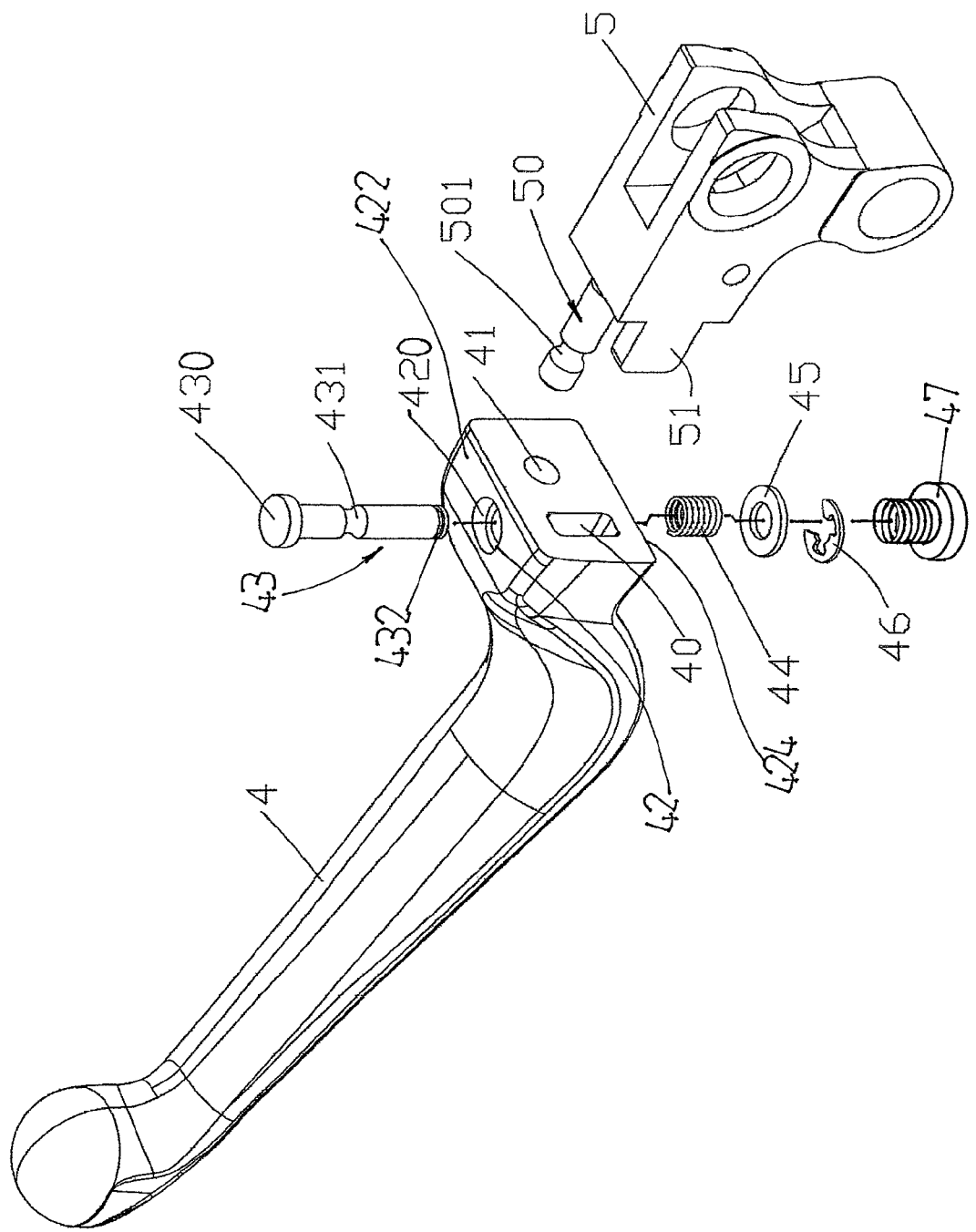
FIG. 2 is an exploded perspective view of the theftproof clutch handle as shown in FIG. 1.
Figure 3:
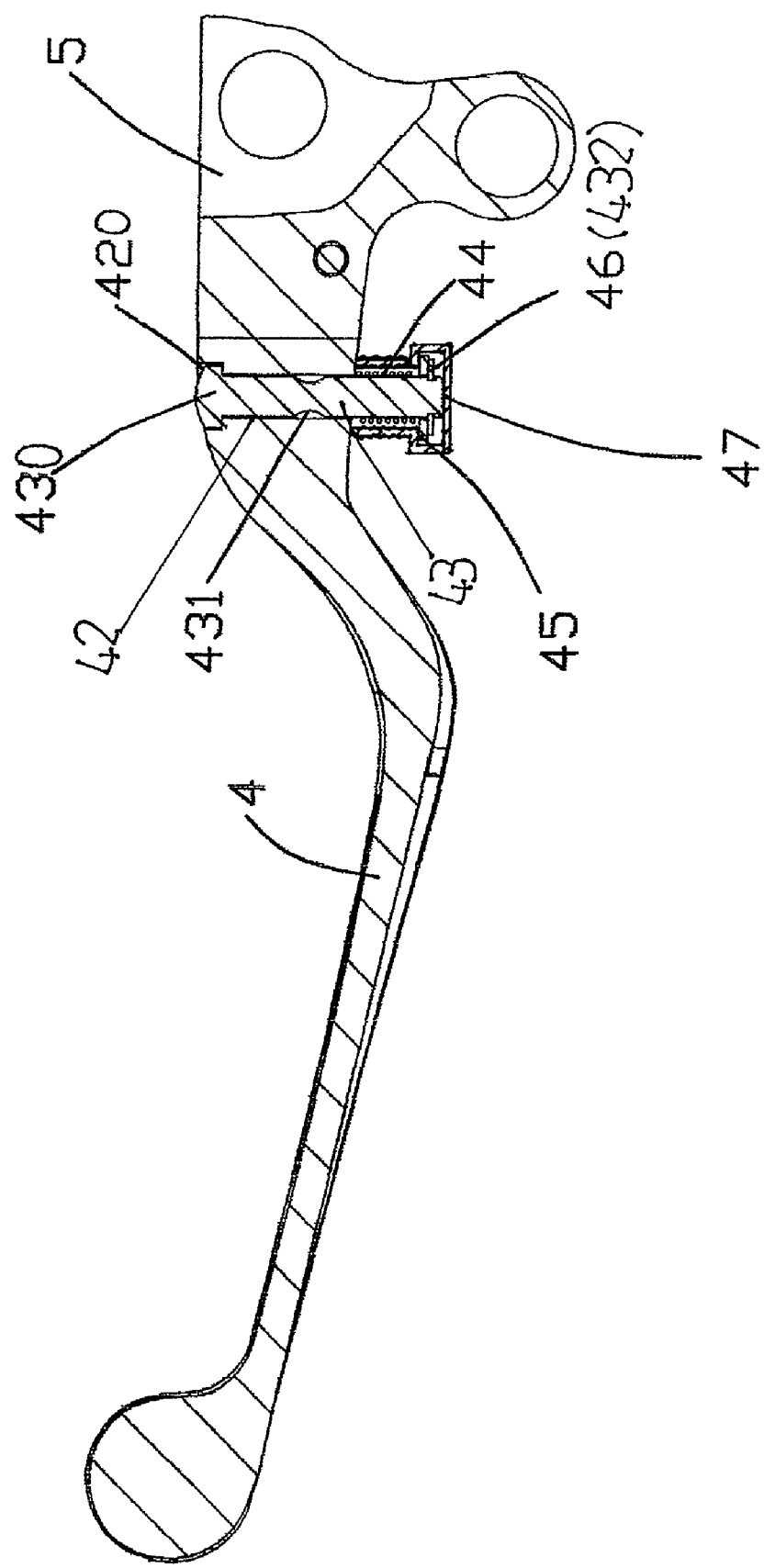
FIG. 3 is a cross-sectional view of the theftproof clutch handle taken along line 3-3 as shown in FIG. 1.

Referring to the drawings and initially to FIGS. 1-6, a theftproof clutch handle for a motorcycle in accordance with the preferred embodiment of the present invention comprises a clutch connector 5, at least one fixed shaft 50 mounted on the clutch connector 5, a handle body 4 removably mounted on the fixed shaft 50, and a locking shaft 43 movably mounted on the handle body 4 and releasably locked onto the fixed shaft 50 to releasably lock the handle body 4 onto the fixed shaft 50 and the clutch connector 5.

The fixed shaft 50 has a first end extending from the clutch connector and a second end provided with a locking groove 501.

The clutch connector 5 has an end face provided with a protruding limit plug 51. The limit plug 51 of the clutch connector 5 is parallel with the fixed shaft 50.

The handle body 4 has an end face provided with at least one shaft hole 41 to allow insertion of the fixed shaft 50. The shaft hole 41 of the handle body 4 is connected to the locking groove 501 of the fixed shaft 50. The end face of the handle body 4 is further provided with a limit slot 40 to allow insertion of the limit plug 51 of the clutch connector 5. The limit slot 40 of the handle body 4 is parallel with the shaft hole 41 of the handle body 4. The handle body 4 has an inner portion provided with a shaft bore 42 to allow insertion of the locking shaft 43. The shaft bore 42 of the handle body 4 is connected to the shaft hole 41 of the handle body 4 and aligns with the locking groove 501 of the fixed shaft 50. The shaft bore 42 of the handle body 4 is perpendicular to the shaft hole 41 of the handle body 4. The shaft bore 42 of the handle body 4 extends through a whole thickness of the handle body 4 and has an end portion provided with a counterbore 420.

The locking shaft 43 is perpendicular to the fixed shaft 50. The locking shaft 43 is secured in the locking groove 501 of the fixed shaft 50 to stop movement of the fixed shaft 50 so as to lock the fixed shaft 50 in the shaft hole 41 of the handle body 4. The locking shaft 43 is movable in the shaft bore 42 of the handle body 4 and has a mediate portion provided with a release groove 431 that is movable to align with the shaft hole 41 of the handle body 4 and the locking groove 501 of the fixed shaft 50 and to allow passage of the fixed shaft 50 so as to release the fixed shaft 50 from the release groove 431 of the locking shaft 43 and to release the locking shaft 43 from the locking groove 501 of the fixed shaft 50. The locking shaft 43 has a first end mounted on a first side 422 of the handle body 4 and a second end protruding outwardly from a second side 424 of the handle body 4. The first end of the locking shaft 43 is provided with an enlarged stop flange 430 that is movable in and stopped by the counterbore 420 of the handle body 4. The second end of the locking shaft 43 is provided with a retaining groove 432.

The theftproof clutch handle further comprises a snap ring 46 mounted on the second end of the locking shaft 43, an elastic member 44 mounted on the locking shaft 43 and biased between the second side 424 of the handle body 4 and the snap ring 46 to move the locking shaft 43 relative to the handle body 4 and to move the release groove 431 of the locking shaft 43 to detach from the locking groove 501 of the fixed shaft 50, a soft protective jacket 47 mounted on the second end of the locking shaft 43 to cover the snap ring 46 and the elastic member 44 to prevent the snap ring 46 and the elastic member 44 from being exposed outwardly from the locking shaft 43, and a washer 45 mounted on the locking shaft 43 and located between the elastic member 44 and the snap ring 46. The snap ring 46 is secured in the retaining groove 432 of the locking shaft 43.

Figure 6:
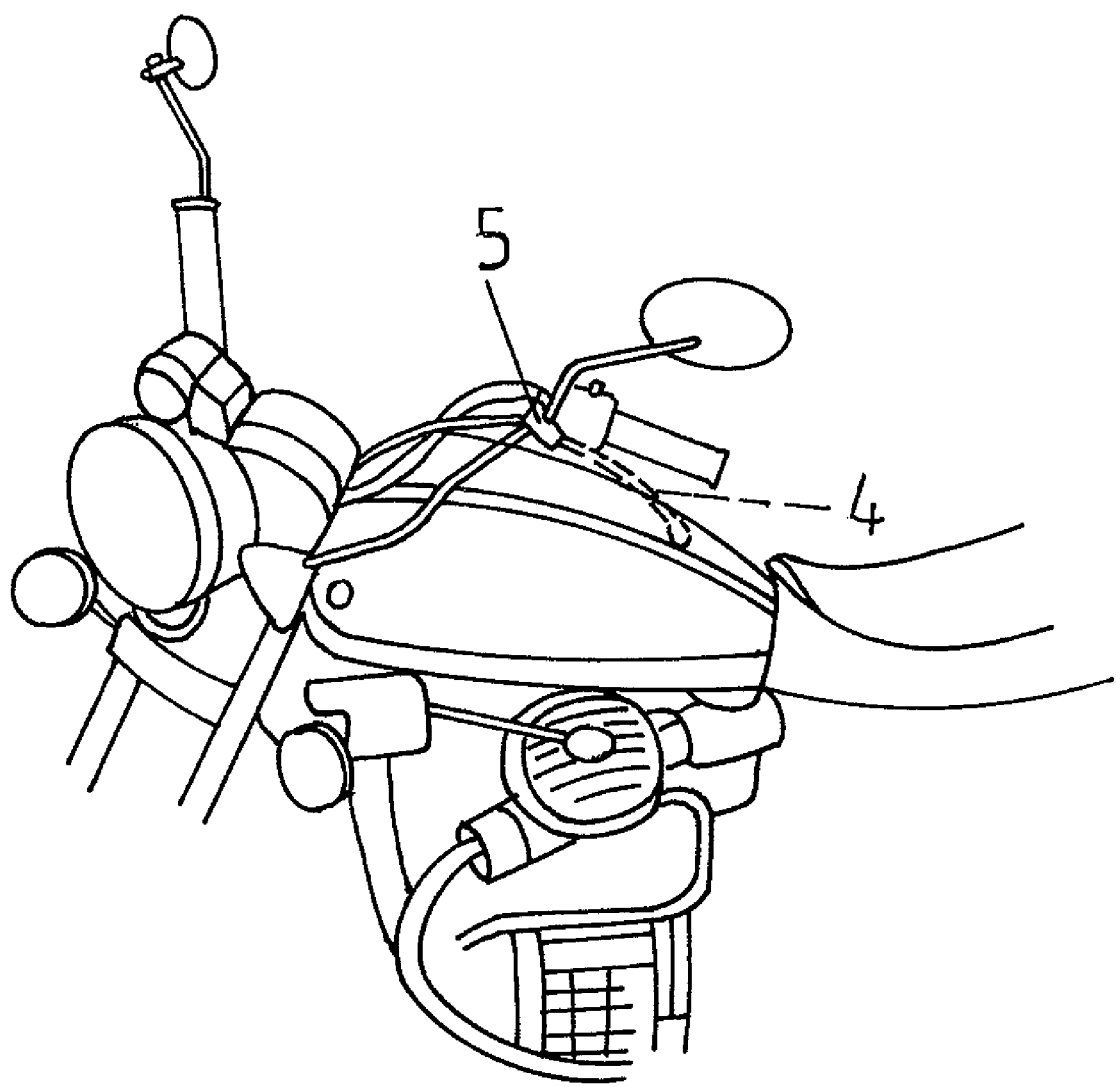
FIG. 6 is a partially perspective view of the theftproof clutch handle for a motorcycle in accordance with the preferred embodiment of the present invention.

As shown in FIG. 6, the clutch connector 5 of the theftproof clutch handle is mounted on a motorcycle, and the handle body 4 is combined with the clutch connector 5 so that the theftproof clutch handle can be operated by a user. At this time, the locking shaft 43 is driven by the elastic force of the elastic member 44, and the release groove 431 of the locking shaft 43 is moved to detach from the locking groove 501 of the fixed shaft 50 as shown in FIG. 4, so that the locking shaft 43 is secured in the locking groove 501 of the fixed shaft 50 to stop movement of the fixed shaft 50 so as to lock the fixed shaft 50 in the shaft hole 41 of the handle body 4.

Figure 4:
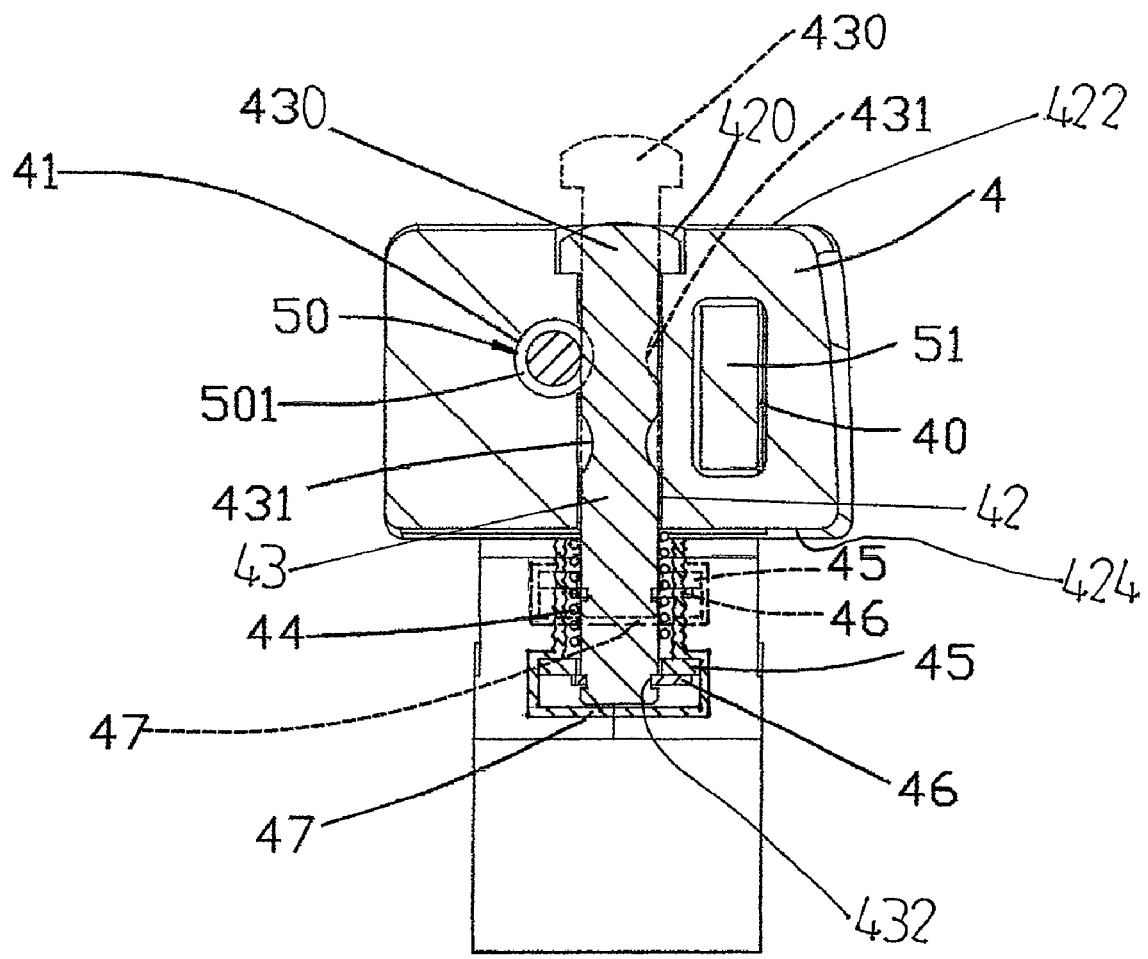
FIG. 4 is a cross-sectional view of the theftproof clutch handle taken along line 4-4 as shown in FIG. 1.
Figure 5:
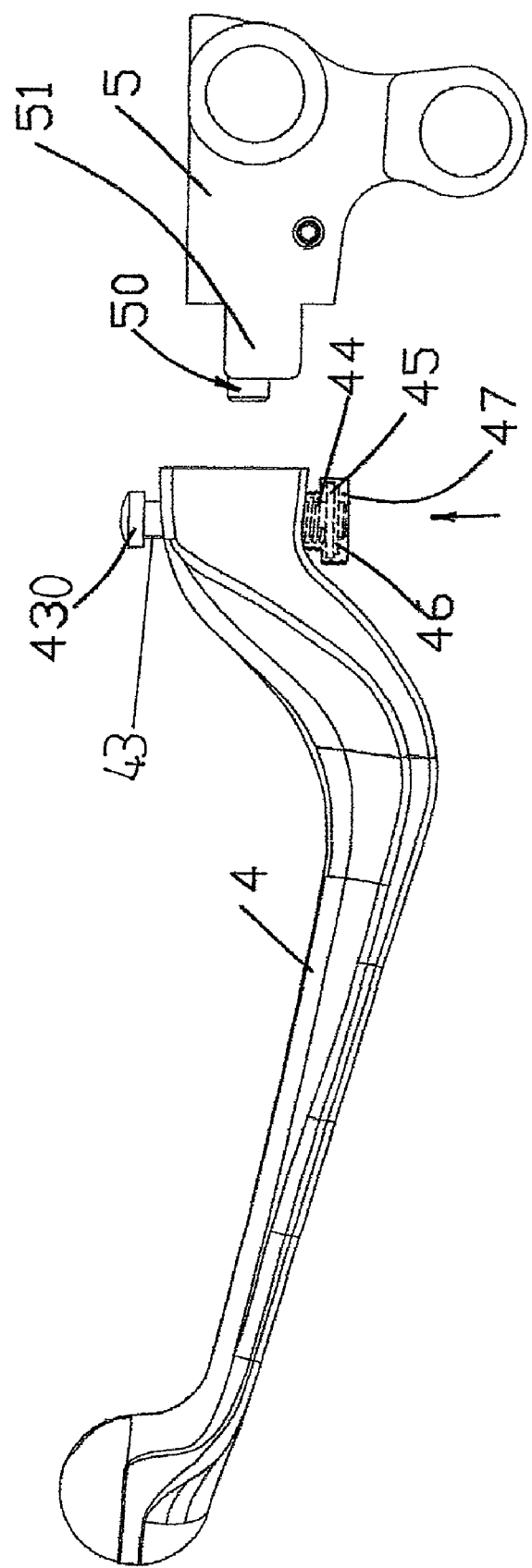
FIG. 5 is an exploded view of the theftproof clutch handle as shown in FIG. 3.

On the contrary, when the protective jacket 47 is pressed toward the handle body 4, the second end of the locking shaft 43 is moved by the protective jacket 47, and the locking shaft 43 is moved relative to the handle body 4 to align the release groove 431 of the locking shaft 43 with the locking groove 501 of the fixed shaft 50 as shown in FIG. 4, so that the fixed shaft 50 is released from the release groove 431 of the locking shaft 43, and the locking shaft 43 is released from the locking groove 501 of the fixed shaft 50. Thus, the fixed shaft 50 is unlocked from the locking shaft 43 so that the shaft hole 41 of the handle body 4 can be detached from the fixed shaft 50 to remove the handle body 4 from the fixed shaft 50 as shown in FIG. 5 to provide a theftproof effect.

Accordingly, when the locking shaft 43 is pressed, the fixed shaft 50 is released from the release groove 431 of the locking shaft 43, and the locking shaft 43 is released from the locking groove 501 of the fixed shaft 50 to unlock the fixed shaft 50 from the locking shaft 43 so that the shaft hole 41 of the handle body 4 can be detached from the fixed shaft 50 to remove the handle body 4 from the fixed shaft 50 so as to provide a theftproof effect. In addition, a user only needs to the locking shaft 43 to remove the handle body 4 from the fixed shaft 50 so that the handle body 4 can be removed from the fixed shaft 50 easily and quickly, thereby facilitating the user detaching the theftproof clutch handle. Further, the locking shaft 43 is fully hidden in the shaft bore 42 of the handle body 4, and the soft protective jacket 47 covers the snap ring 46 and the elastic member 44 to prevent the snap ring 46 and the elastic member 44 from being exposed outwardly from the locking shaft 43, so that the theftproof clutch handle has an outstanding outer appearance.

Figure 7:
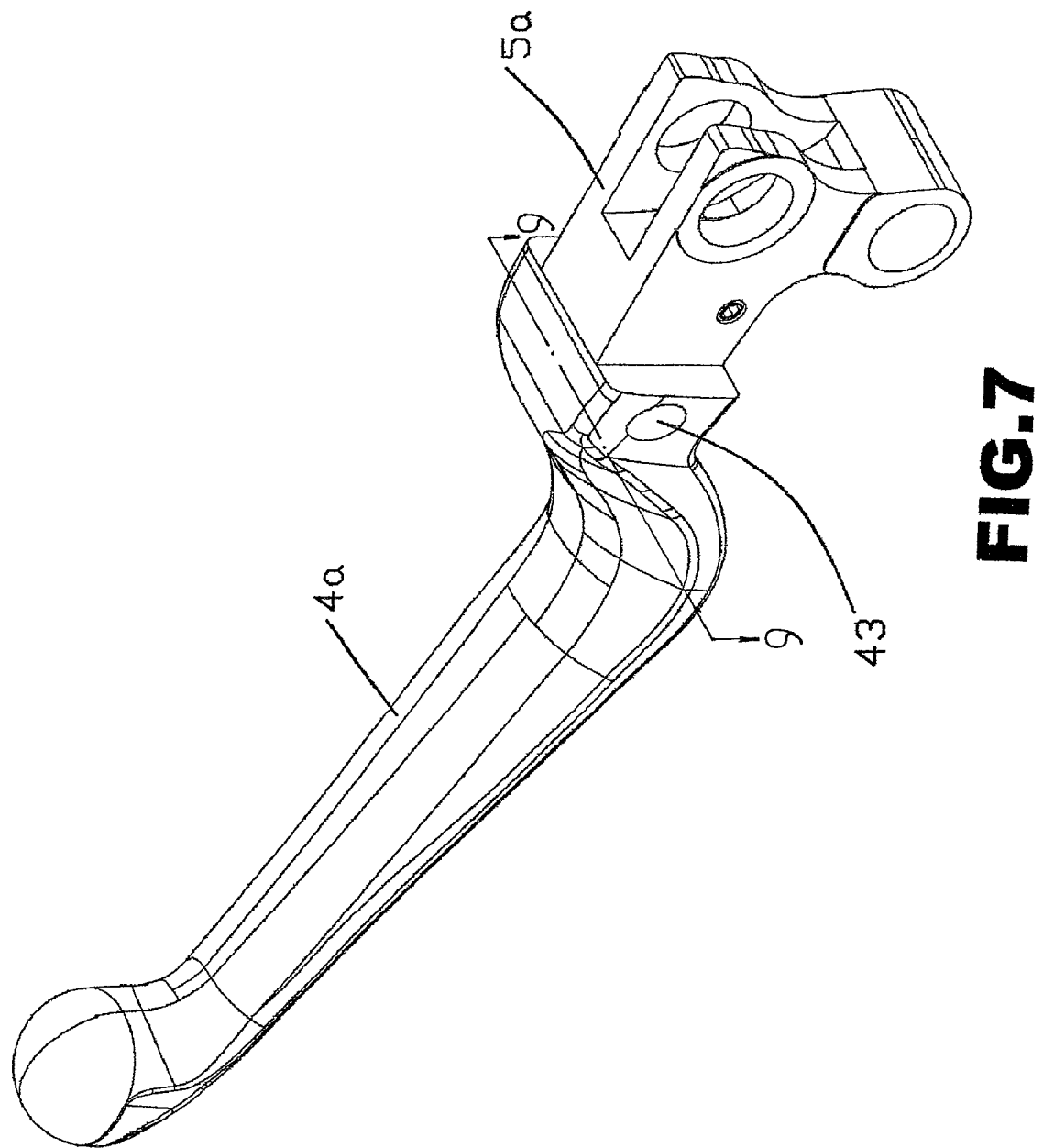
FIG. 7 is a perspective view of a theftproof clutch handle in accordance with another preferred embodiment of the present invention.
Figure 8:
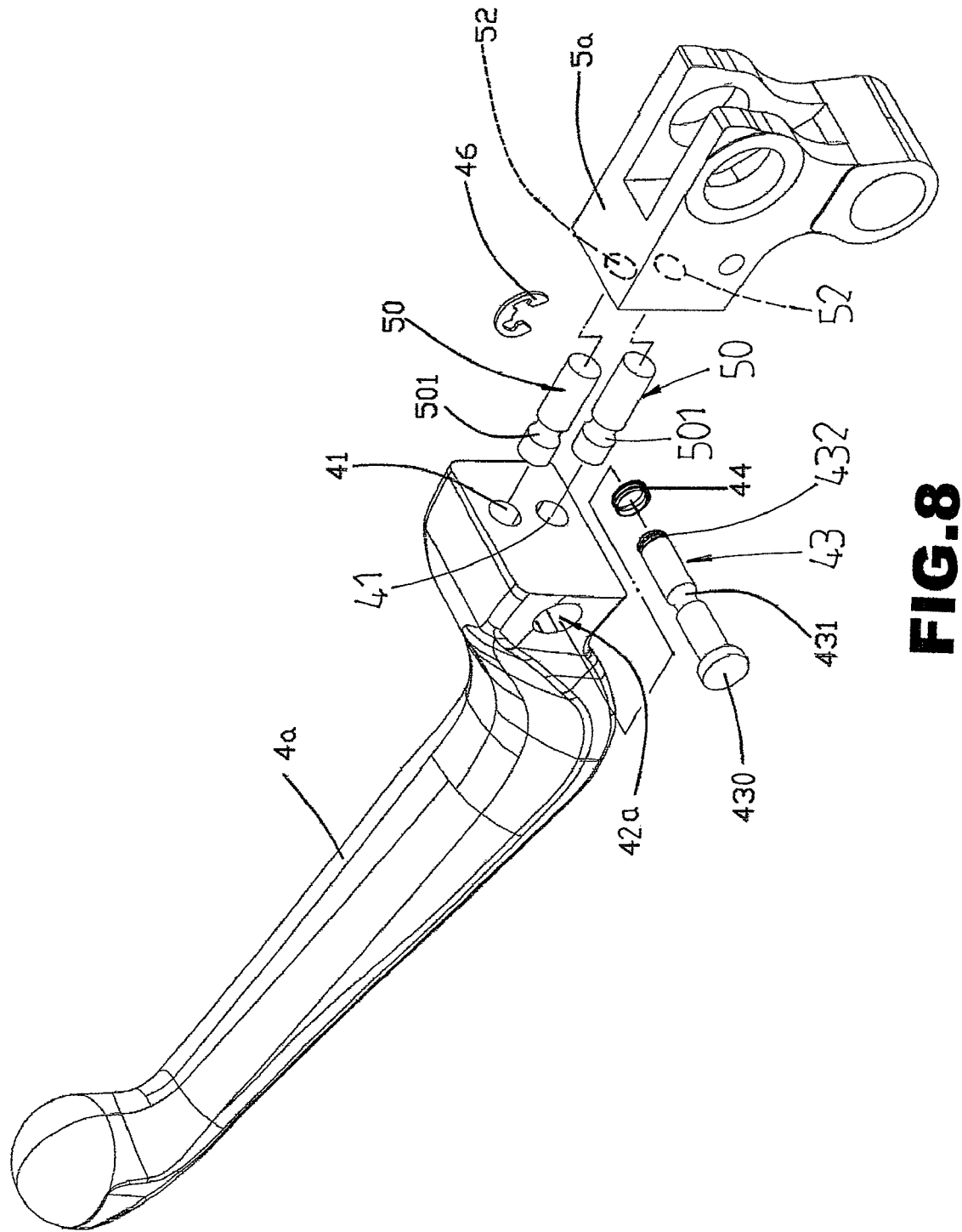
FIG. 8 is an exploded perspective view of the theftproof clutch handle as shown in FIG. 7.
Figure 9:
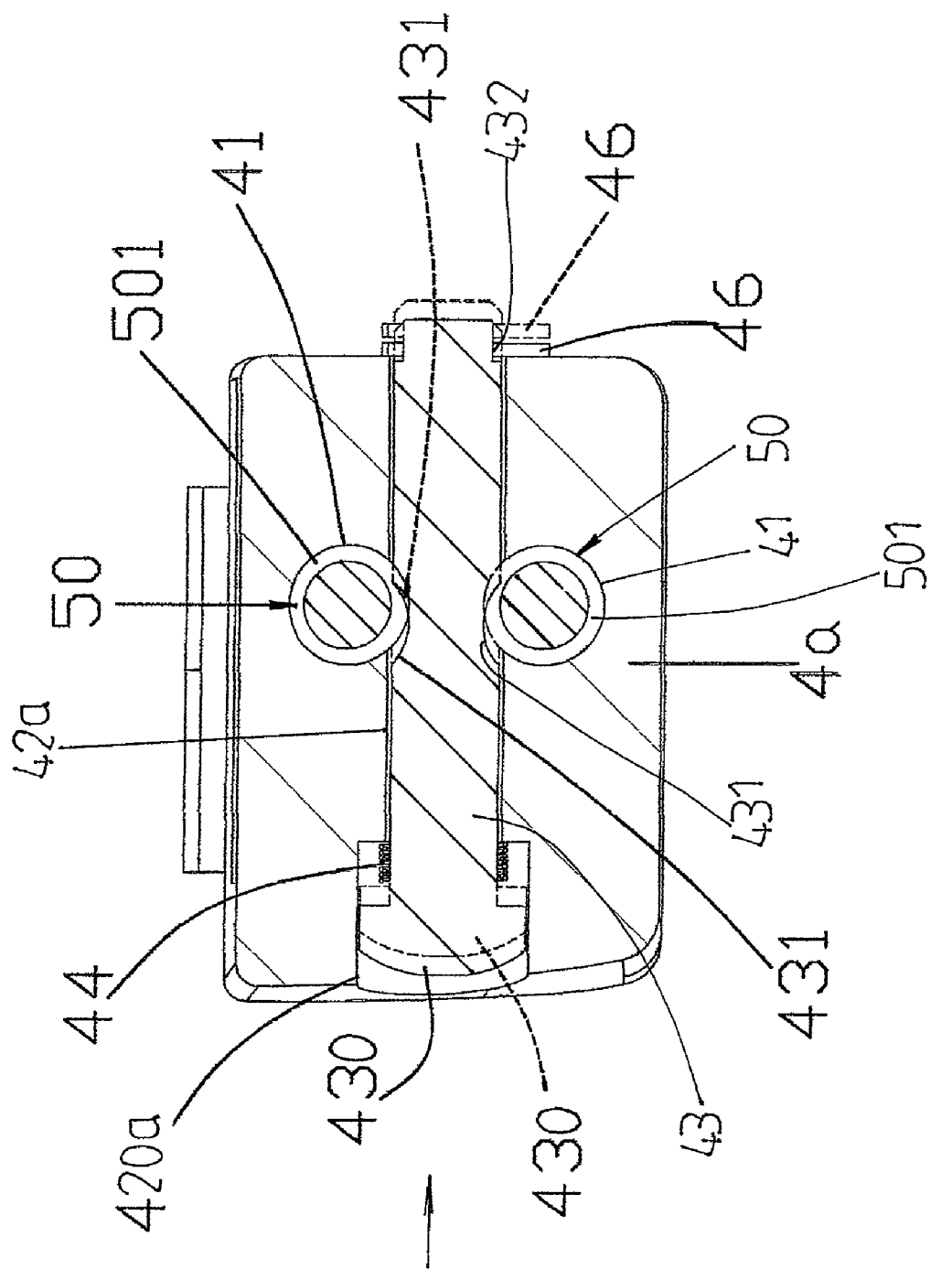
FIG. 9 is a cross-sectional view of the theftproof clutch handle taken along line 9-9 as shown in FIG. 7.
Figure 10:
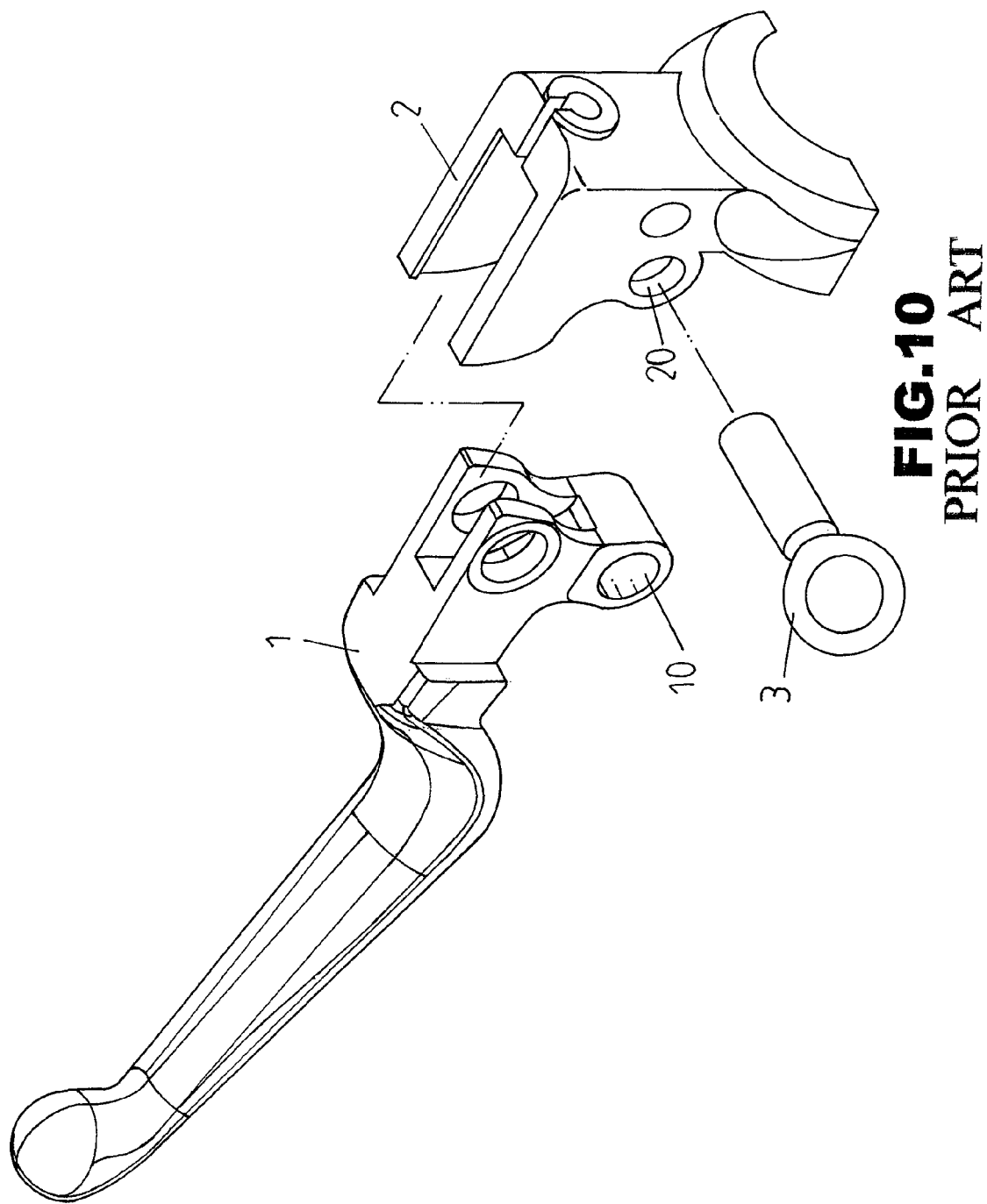
FIG. 10 is an exploded perspective view of a conventional theftproof clutch handle for a motorcycle in accordance with the prior art.

Referring to FIGS. 7-9, the theftproof clutch handle comprises two fixed shafts 50 each mounted on the clutch connector 5a, and the handle body 4a has an end face provided with two shaft holes 41 to allow insertion of the two fixed shafts 50. Each of the two fixed shafts 50 has a first end extending from the clutch connector 5a and a second end provided with a locking groove 501. The clutch connector 5a has an end face provided with two fixing holes 52 for fixing the two fixed shafts 50. The locking shaft 43 is located between the two fixed shafts 50 and is secured in the locking groove 501 of each of the two fixed shafts 50 to stop movement of the two fixed shafts 50 so as to lock the two fixed shafts 50 in the two shaft holes 41 of the handle body 4a respectively. The locking shaft 43 has a mediate portion provided with a release groove 431 that is movable to align with the two shaft holes 41 of the handle body 4a and the locking groove 501 of each of the two fixed shafts 50 and to allow passage of the two fixed shafts 50 so as to release the two fixed shafts 50 from the release groove 431 of the locking shaft 43 and to release the locking shaft 43 from the locking groove 501 of each of the two fixed shafts 50. The theftproof clutch handle further comprises an elastic member 44 mounted on the locking shaft 43 and biased between the stop flange 430 of the locking shaft 43 and the counterbore 420a of the shaft bore 42a to move the locking shaft 43 relative to the handle body 4a and to move the release groove 431 of the locking shaft 43 to detach from the locking groove 501 of each of the two fixed shafts 50.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A theftproof clutch handle, comprising:
   a clutch connector;
   at least one fixed shaft mounted on the clutch connector;
   a handle body removably mounted on the fixed shaft;
   a locking shaft movably mounted on the handle body and releasably locked onto the fixed shaft to releasably lock the handle body onto the fixed shaft and the clutch connector; wherein
   the fixed shaft has a first end extending from the clutch connector and a second end provided with a locking groove;
   the locking shaft is secured in the locking groove of the fixed shaft to stop movement of the fixed shaft so as to lock the fixed shaft in the shaft hole of the handle body.

2. The theftproof clutch handle of claim 1, wherein
   the handle body has an end face provided with at least one shaft hole to allow insertion of the fixed shaft;

the handle body has an inner portion provided with a shaft bore to allow insertion of the locking shaft;

the locking shaft has a mediate portion provided with a release groove that is movable to align with the shaft hole of the handle body and the locking groove of the fixed shaft and to allow passage of the fixed shaft so as to release the fixed shaft from the release groove of the locking shaft and to release the locking shaft from the locking groove of the fixed shaft.

3. The theftproof clutch handle of claim 2, wherein the locking shaft has a first end mounted on a first side of the handle body and a second end protruding outwardly from a second side of the handle body;

the theftproof clutch handle further comprises:

a snap ring mounted on the second end of the locking shaft;

an elastic member mounted on the locking shaft and biased between the second side of the handle body and the snap ring to move the locking shaft relative to the handle body and to move the release groove of the locking shaft to detach from the locking groove of the fixed shaft.

4. The theftproof clutch handle of claim 3, wherein the shaft bore of the handle body has an end portion provided with a counterbore;

the first end of the locking shaft is provided with an enlarged stop flange that is movable in and stopped by the counterbore of the handle body.

5. The theftproof clutch handle of claim 3, wherein the second end of the locking shaft is provided with a retaining groove;

the snap ring is secured in the retaining groove of the locking shaft.

6. The theftproof clutch handle of claim 5, further comprising:

a washer mounted on the locking shaft and located between the elastic member and the snap ring.

7. The theftproof cluth handle of claim 3, further comprising:

a soft protective jacket mounted on the second end of the locking shaft to cover the snap ring and the elastic member to prevent the snap ring and the elastic member from being exposed outwardly from the locking shaft.

8. The theftproof clutch handle of claim 3, wherein the locking shaft is movable in the shaft bore of the handle body;

the shaft bore of the handle body extends through a whole thickness of the handle body.

9. The theftproof clutch handle of claim 2, wherein the clutch connector has an end face provided with a protruding limit plug;

the limit plug of the clutch connector is parallel with the fixed shaft;

the end face of the handle body is further provided with a limit slot to allow insertion of the limit plug of the clutch connector;

the limit slot of the handle body is parallel with the shaft hole of the handle body.

10. The theftproof clutch handle of claim 2, wherein the shaft hole of the handle body is connected to the locking groove of the fixed shaft;

the shaft bore of the handle body is connected to the shaft hole of the handle body and aligns with the locking groove of the fixed shaft.

11. The theftproof clutch handle of claim 2, wherein the shaft bore of the handle body is perpendicular to the shaft hole of the handle body;

the locking shaft is perpendicular to the fixed shaft.

12. The theftproof clutch handle of claim 1, wherein the locking shaft is fully hidden in the shaft bore of the handle body.

13. A theftproof clutch handle, comprising:

a clutch connector;

at least one fixed shaft mounted on the clutch connector;

a handle body removably mounted on the fixed shaft;

a locking shaft movably mounted on the handle body and releasably locked onto the fixed shaft to releasably lock the handle body onto the fixed shaft and the clutch connector; wherein the theftproof clutch handle comprises two fixed shafts each mounted on the clutch connector;

each of the two fixed shafts has a first end extending from the clutch connector and a second end provided with a locking groove;

the locking shaft is located between the two fixed shafts and is secured in the locking groove of each of the two fixed shafts to stop movement of the two fixed shafts so as to lock the two fixed shafts in the two shaft holes of the handle body respectively.

14. The theftproof clutch handle of claim 13, wherein the handle body has an end face provided with two shaft holes to allow insertion of the two fixed shafts;

the handle body has an inner portion provided with a shaft bore connected to the two shaft holes of the handle body to allow insertion of the locking shaft;

the locking shaft has a mediate portion provided with a release groove that is movable to align with the two shaft holes of the handle body and the locking groove of each of the two fixed shafts and to allow passage of the two fixed shafts so as to release the two fixed shafts from the release groove of the locking shaft and to release the locking shaft from the locking groove of each of the two fixed shafts.

15. The theftproof clutch handle of claim 14, wherein the locking shaft has a first end mounted on a first side of the handle body and a second end protruding outwardly from a second side of the handle body;

the shaft bore of the handle body has an end portion provided with a counterbore;

the first end of the locking shaft is provided with an enlarged stop flange that is movable in and stopped by the counterbore of the handle body;

the theftproof clutch handle further comprises:

a snap ring mounted on the second end of the locking shaft;

an elastic member mounted on the locking shaft and biased between the stop flange of the locking shaft and the counterbore of the shaft bore to move the locking shaft relative to the handle body and to move the release groove of the locking shaft to detach from the locking groove of each of the two fixed shafts.

16. The theftproof clutch handle of claim 14, wherein the locking shaft is fully hidden in the shaft bore of the handle body.

17. The theftproof clutch handle of claim 13, wherein the clutch connector has an end face provided with two fixing holes for fixing the two fixed shafts.

* * * * *